Feb. 8, 1966 A. HAVESON 3,234,467

MINIATURE RADIO TUNING STRUCTURE

Filed Dec. 27, 1962 3 Sheets-Sheet 1

INVENTOR.
ALBERT HAVESON

BY

OSTROLENK, FABER, GERB & SOFFEN

ATTORNEYS

Feb. 8, 1966 A. HAVESON 3,234,467

MINIATURE RADIO TUNING STRUCTURE

Filed Dec. 27, 1962 3 Sheets-Sheet 2

INVENTOR.
ALBERT HAVESON

BY

OSTROLENK, FABER, GERB & SOFFEN

ATTORNEYS

Feb. 8, 1966 A. HAVESON 3,234,467

MINIATURE RADIO TUNING STRUCTURE

Filed Dec. 27, 1962 3 Sheets-Sheet 3

INVENTOR.
ALBERT HAVESON

BY

OSTROLENK, FABER, GERB & SOFFEN

ATTORNEYS

United States Patent Office 3,234,467
Patented Feb. 8, 1966

3,234,467
MINIATURE RADIO TUNING STRUCTURE
Albert Haveson, 201 Renfrew Ave., Trenton, N.J.
Filed Dec. 27, 1962, Ser. No. 247,654
8 Claims. (Cl. 325—361)

My invention relates to a novel miniature radio, and more specifically relates to a novel miniature radio which is self-contained along with power source and antenna in a light-weight housing which can be worn directly on a listener's ear wherein a novel arrangement of components permit relatively good quality reception and inexpensive manufacture.

Miniature radios which can be worn on the ear are known to the art. Such radios, however, where minimum cost and reasonably good reception is an important consideration are relatively heavy, thus making the use of such a radio uncomfortable.

The present invention provides a novel arrangement of components which can, for example, be contained within a circular housing wherein the receiving antenna is formed of an arcuate ferrite core which is contained in the rim of the housing and conforms to the shape of the rim. This novel core can be made relatively movable with respect to an arcuately shaped coil to achieve tuning of a desired carrier frequency, or the core can be stationarily positioned with respect to its cooperating antenna coil with a tuning capacitor being used.

Several novel features of construction are utilized to permit ease of assembly and manufacture of the system as well as ease of use.

Accordingly, a primary object of this invention is to provide a novel miniature radio which is low in weight.

A further object of this invention is to provide a novel miniature radio having a circular configuration which utilizes an arcuately shaped ferrite core in the radio antenna which conforms to the shape of the rim of the housing.

A further object of this invention is to provide a novel miniature radio which can be produced at minimum cost with relatively good reception.

Yet another object of this invention is to provide a novel miniature radio which can be worn in the ear, and which is provided with simple tuning control which is operable without removing the radio from the ear.

Another object of this invention is to provide a novel miniature radio which can be worn in the ear which is adapted for use with long life, low cost D.-C. sources.

These and other objects of my novel invention will become apparent from the following description when taken in connection with the drawings, in which.

Figure 3A:
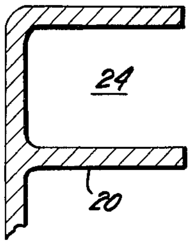
FIGURE 3 shows a plan view of the interior of the rear casing of the radio receiver of FIGURES 1 and 2.
Figure 3B:
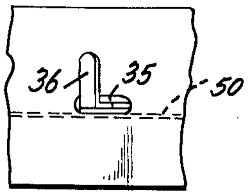
Figure 3:
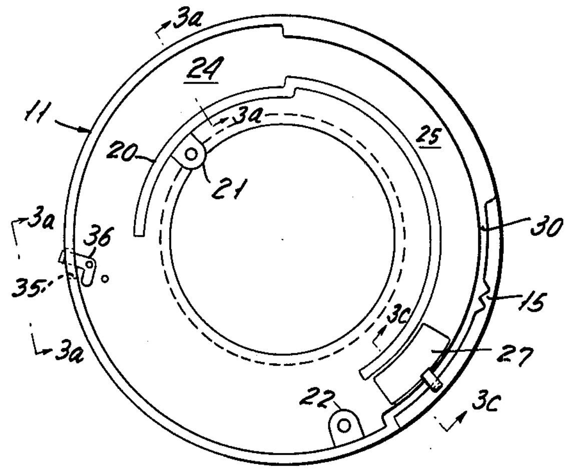

FIGURE 3*a* shows a cross-sectional view of FIGURE 3 when seen across the lines 3*a*—3*a* in FIGURE 3.

FIGURE 3*b* particularly illustrates a front plan view of the "on-off" switch contained in the casing of FIGURE 3, as seen from lines 3*b*—3*b* in FIGURE 3.

Figure 3C:
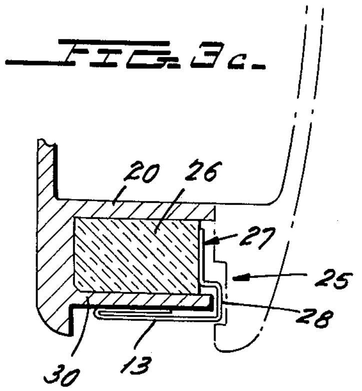

FIGURE 3*c* is a cross-sectional view of FIGURE 3 taken across the lines 3*c*—3*c* in FIGURE 3, and particularly illustrates the placement of the ferrite core in a receiving chamber molded into the rear casing.

Figure 1:
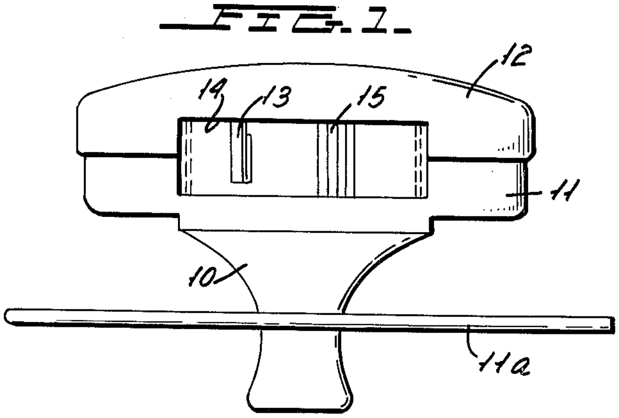
FIGURE 1 shows a side plan view of one embodiment of a miniature radio constructed in accordance with the invention.
Figure 2:
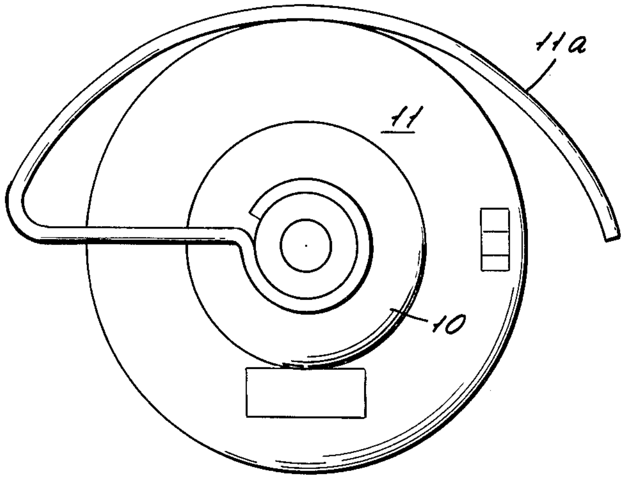
FIGURE 2 shows a rear view of FIGURE 1 when looking in toward the ear-piece which contains a speaker.
Figures 4, 6, 7:
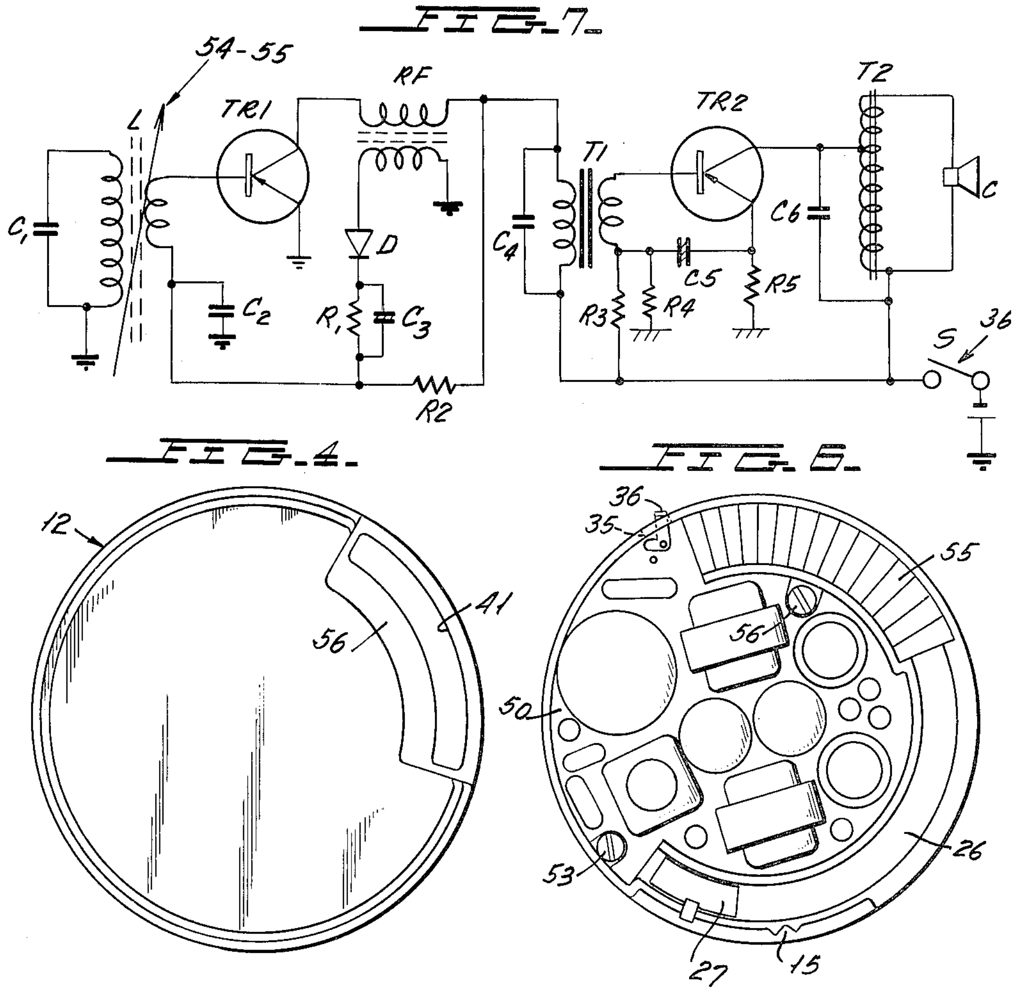

FIGURE 4 is a plan view of the interior of the upper casing of FIGURES 1 and 2.

Figure 4A:
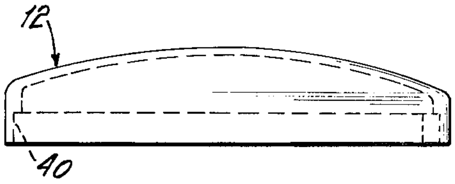

FIGURE 4*a* is a side view of the casing of FIGURE 4.

Figure 5:
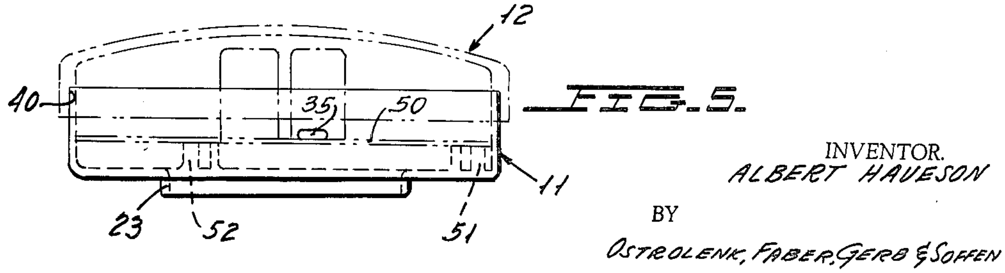

FIGURE 5 illustrates the manner in which the casings of FIGURES 3 and 4 are fitted together.

FIGURE 6 illustrates a top plan view of the rear casing of FIGURE 3 when the circuit panel is secured to the casing.

FIGURE 7 is a schematic diagram of a typical electric circuit which could be secured to the panel of FIGURE 6 for reception of radio signals.

Figures 8, 9:
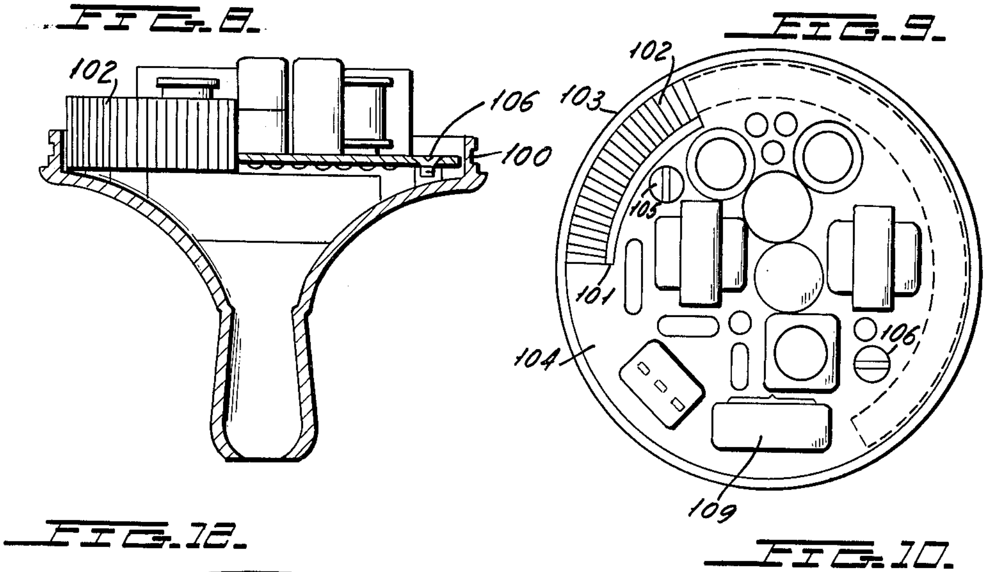

FIGURE 8 illustrates a side cross-sectional view of a second embodiment of the invention wherein the arcuate ferrite core is not carried in the rear casing.

FIGURE 9 is a top view of the rear casing of FIGURE 8.

Figure 10:
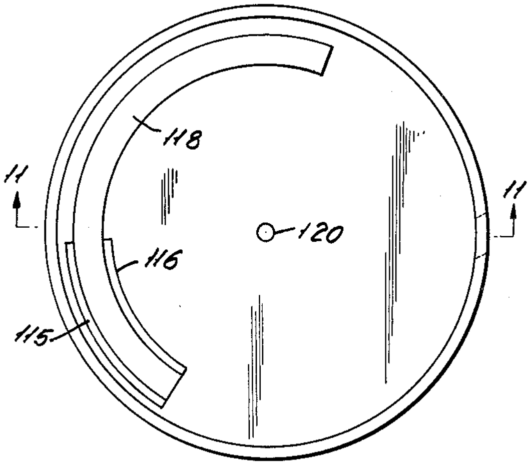

FIGURE 10 is a plan view of the upper casing for the device of FIGURES 8 and 9, and illustrates the manner in which the ferrite core is contained within the upper casing.

Figures 11, 13:
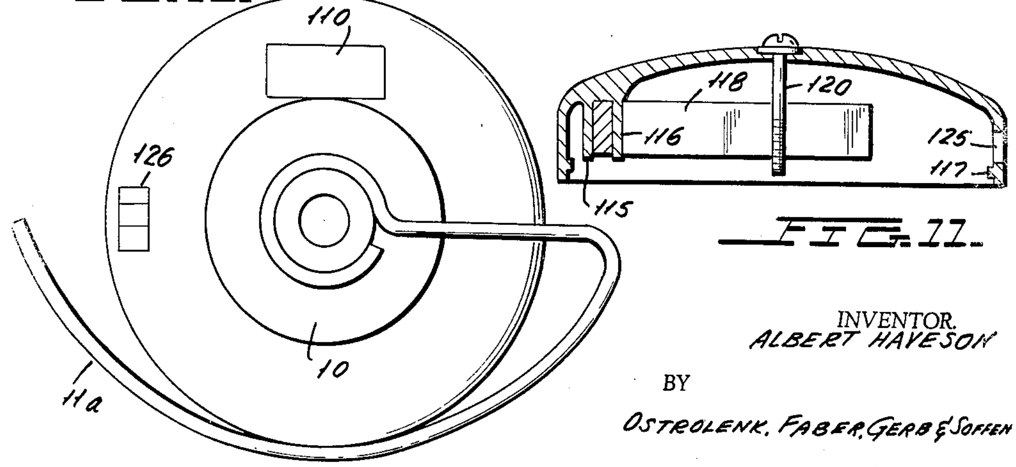

FIGURE 11 is a side cross-sectional view of the upper casing of FIGURE 10 as seen across the lines 11—11 in FIGURE 10.

Figure 12:
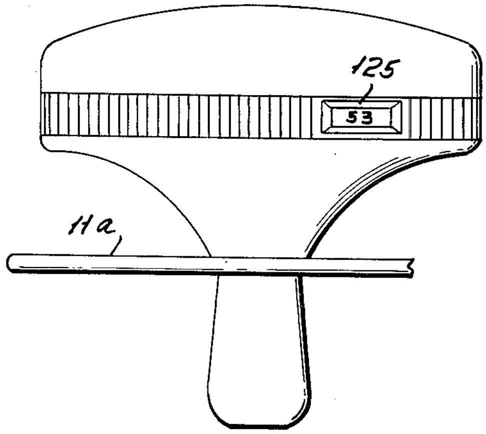

FIGURE 12 illustrates the upper and lower casings of FIGURES 8 through 11 in their assembled condition, and particularly illustrates the manner in which a viewing window may be provided.

FIGURE 13 is a rear view of FIGURE 12, and particuarly illustrates the manner in which a battery may be inserted, and a view of the "on-off" switch.

Referring first to FIGURES 1 and 2, I have illustrated therein a novel miniature radio which includes an ear-piece 10 which is secured to a rear housing 11 which, in turn, is covered by a front housing 12. The ear-piece 10 has a wire **11*a* secured thereto to permit the ear-piece to be inserted in the ear with wire 11*a*** placed behind the ear to hold the complete radio in its position.

In a typical receiver of the type to which the invention relates, the diameter of the radio will be of the order of 43 millimeters, while the thickness of the two casings 11 and 12 after assembly will be of the order of 15 millimeters. The total weight of the assembled device will then be of the order of 1¼ ounces, whereby the complete assembly can be worn on the ear for long lengths of time without discomfort.

As seen in FIGURE 1, a tuning arm 13 is exposed through a window 14 where the tuning arm 13 can be positioned by the wearer at any position whereby any radio frequency of the band available can be selected.

A detent structure 15 which will be described more fully hereinafter, may also be provided for accurately positioning arm 13 at a preselected frequency.

The construction of rear casing 11 is best shown in FIGURE 3 where it is seen that casing 11 may be formed of a single unitary molding of an appropriate plastic which has integrally formed therein a rib section 20 and extending ears 21 and 22 which are used for connection to a circuit panel, as will be described hereinafter.

It should also be noted that rear panel 11 has an extending flange 23, best shown in FIGURE 5, which is used to receive the ear-piece 10, as by a friction-fit or by providing appropriate cooperating threads between flange 23 and ear-piece 10, or by a snap-fit type arrangement, or in any other desired manner.

In FIGURE 3, it will be noted that the rib section 20 defines two arcuate chambers 24 and 25. The arcuate chamber 24, as will be described more fully hereinafter, receives an antenna coil, while chamber 25 receives an arcuate ferrite core which is movable into and out of the coil contained in chamber 24. The arrangement of chamber 24 is shown in more detail in FIGURE 3*a*, while the manner in which a ferrite core is fitted in chamber 25 is shown in detail in FIGURE 3*c* where a ferrite core 26 is contained in chamber 25. It is to be noted that the ferrite core 26 has a reduced height portion 27 which receives an extending sheet-metal plate 28 which terminates in tuning arm 13. Plate 28 can be secured to the ferrite core 26 as by cementing, or in any other desired manner.

The arm 13 is shown as being a double element whereby the inner end of the arm can be bent outwardly into frictional engagement with the adjacent portion of the casing. This will provide a frictional force tending to retain the arm in its adjusted position.

The core 26 fits within chamber 25 in a relatively tight fit to prevent excessive movement of the core within chamber 25. However, the fit must be sufficiently loose that the core can easily arcuately slide within the channel 25.

The extending rim portion 30 of housing 11 which is within the range of adjustment of arm 13 is recessed in FIGURE 3 so that arm 13 does not project beyond the peripheral surface of the rim of cover 11. Clearly, however, this recessing is not essential to the good operation of the device, although it is extremely useful in keeping the tuning arm 13 from being accidentally struck.

Moreover, FIGURE 3 shows the detent 15 of FIGURE 1 where it will now be understood that the detent 15 can be placed at some preferred frequency within the band of frequencies which are available. By way of example, where a radio is to be used at local events such as sporting events, or the like, the detent can be positioned to permit easy selection of a local broadcast frequency, which broadcasts details of the event being observed, or similar local information.

The housing 11, as best shown in FIGURES 3*b* and 5, has an opening 35 through which an "on-off" switch 36 may project.

The upper cover 12 of FIGURES 1 and 2 is shown in more detail in FIGURES 4 and 4*a*. Referring now to FIGURES 4 and 4*a*, it will be seen that the upper cover has a relatively simple construction which is easily molded in a unitary body, and is provided with an internal shoulder 40 and a cut-away section 41 which is required in forming the window 14 of FIGURE 1.

As is best shown in FIGURE 5, the shoulder 40 of cover 12 is forced on the rim of the rear housing 11 in a friction-tight manner. Clearly, however, a snap-type fitting could be provided, if desired. Moreover, any other type of arrangement could be provided for securing the rear cover 11 and front cover 12 together as by an appropriate screw means.

It will be recalled from FIGURE 3 that the rear molding 11 is provided with projecting ears 21 and 22. These projecting ears serve as supports for a circuit panel 50, shown in FIGURE 6, which is cut out to conform to the shape of rib 20 so that the panel may be inserted into housing 11 until it reaches the position indicated in FIGURES 3*b* and 5, and rests against appropriate stops such as stops 51 and 52 of FIGURE 5. Thereafter, appropriate screw fastening means such as screws 53 and 54 are secured to ears 22 and 21 respectively to hold the panel rigidly in position.

A tuning coil 55 is then inserted in chamber 24 of FIGURE 3, as shown in FIGURE 6, and can be cemented in place where the tuning coil 55 has the arcuate ferrite core 26 positioned therein with the ferrite core 26 fitting into chamber 25.

After this assembly, the cover 12 is connected to the rear housing 11 to complete the assembly and to retain the ferrite core 26 in position.

Preferably, the cover 12 will have a molded extension 56 which will lie immediately atop the ferrite core 26 when the cover 12 is closed.

While any suitable electrical circuitry can be used for the radio circuit secured to panel 50, the operation of typical circuits has been found to be appreciably improved when ferrite core 26 is utilized in the tuning circuit. Moreover, and even where the ferrite core 26 is stationarily positioned with respect to coil 55 with a tuning capacitor being used, improved operation has also been found to result.

A typical radio circuit which could be used for the device of FIGURE 6 is schematically illustrated in FIGURE 7, and is comprised of a typical two transistor unit wherein the elements identified in FIGURE 7 are as follows:

| | |
|---|---|
| L ------- | Tuning antenna. |
| RF ------ | High frequency coil. |
| D ------- | Diode. |
| T1 ------ | Input transformer. |
| T2 ------ | Output transformer. |
| T*r*1 ------ | High frequency transistor. |
| T*r*2 ------ | Low frequency transistor. |
| C ------- | Crystal speaker. |
| C1 ------ | Ceramic condenser (100 micromicrofarads). |
| C2 ------ | Ceramic condenser (0.01 microfarad). |
| C3 ------ | Chemical condenser (3 v., 10 microfarads). |
| C4 ------ | Ceramic condenser (0.005 microfarad). |
| C5 ------ | Electrolytic condenser (3 v., 10 microfarads). |
| C6 ------ | Ceramic condenser (0.01 microfarad). |
| R1 ------ | 10K ohm. |
| R2 ------ | 75K ohm. |
| R3 ------ | 10K ohm. |
| R4 ------ | 5K ohm. |
| R5 ------ | 500K ohm. |

Referring now to FIGURES 8 and 9, I have illustrated therein a second embodiment of the lower casing and ear-piece wherein the rim of the lower casing has a depressed channel 100 therein which receives a cooperating rib in the top casing, as will be described.

The lower casing, as best seen in FIGURE 9, is formed with a short rib 101 which is arranged to receive the tuning coil 102 which is cemented between the outer rim of the housing 103 and rib 102. The circuit panel board 104 which may be similar to that described in FIGURE 6 is then secured to the lower casing by screws 105 and 106 in the usual manner.

It will be noted that the arrangement of components differs from that of FIGURE 6 in that the battery 108 in FIGURE 6, which was disposed to lie in the plane of the casing, now lies perpendicularly to board 104, as shown by the perpendicular battery 109 which is received by appropriate battery clips of board 104, in FIGURE 9.

If desired, the lower casing may have an opening 110 therein, shown in FIGURE 13, through which battery 109 may be installed into the casing and into appropriate clips without requiring removal of the top casing from the lower casing.

The top casing is illustrated in FIGURES 10 and 11 as having integrally formed ribs 115 and 116, as well as an extending annular rib 117 which is fitted into depression 100 of FIGURE 8 to secure the upper housing to the lower housing during assembly.

A ferrite core 118 which is arcuately shaped in accordance with the invention is then cemented between ribs 115 and 116, as illustrated in FIGURE 10, where it is disposed in such a manner that when assembled to the housing of FIGURES 8 and 9, rotation of the upper housing will cause the ferrite core to move into and out of coil 102, as illustrated in dotted lines in FIGURE 9.

Thus, tuning is obtained by simply rotating the upper housing with respect to the lower housing, the engagement of rib 117 and depression 100 being loose enough to permit such rotation in a convenient manner.

If desired, additional securing means such as a screw 120 which is rotatably carried in the upper casing may extend therethrough, as illustrated in FIGURE 11 and thread into an appropriate tapped opening in board 104. Appropriate washer means may be connected below the screw head to permit rotation of the upper casing with respect to the screw wherein screw 120 prevents the accidental removal of the upper casing from the lower casing.

FIGURE 12 illustrates in plan view how the upper casing may be provided with a window 125. The window 125 is immediately adjacent the interior of extending rib 103 (FIGURE 9) which may have a frequency band inscribed thereon whereby observation through window 125 will indicate the station to which one is tuned.

FIGURE 13 additionally indicates the presence of an "on-off" switch 126 which is on the interior of the casing, and extends through an appropriate opening in the rear casing structure.

Although I have described preferred embodiments of my novel invention, many variations and modifications will now be obvious to those skilled in the art, and I prefer therefore to be limited not by the specific disclosure herein by only by the appended claims.

I claim:

1. An antenna for a miniature radio comprising a ferrite core and coil disposed to receive said ferrite core and a housing; said housing having a peripheral rim; the interior of said peripheral rim having an annular channel secured thereto; each of said ferrite core and said coil arcuately shaped; said ferrite core positioned within said coil; said ferrite core and said coil disposed within said annular channel.

2. An antenna for a miniature radio comprising a ferrite core and coil disposed to receive said ferrite core and a housing; each of said ferrite core and said coil arcuately shaped; said ferrite core positioned within said coil; said ferrite core and said coil disposed within said housing; said housing having a disk-shape with a circular periphery; said ferrite core and coil contained interiorly of said circular periphery and arcuately conforming to the circular configuration of said circular periphery.

3. An antenna for a miniature radio comprising a ferrite core and coil disposed to receive said ferrite core and a housing; said housing having a peripheral rim; the interior of said peripheral rim having an annular channel secured thereto; each of said ferrite core and said coil arcuately shaped; said ferrite core positioned within said coil; said ferrite core and said coil disposed within said annular channel; said ferrite core relatively movable with respect to said coil to be advanceable into and out of said coil.

4. An antenna for a miniature radio comprising a ferrite core and coil disposed to receive said ferrite core and a housing; said housing having a peripheral rim; the interior of said peripheral rim having an annular channel secured thereto; each of said ferrite core and said coil arcuately shaped; said ferrite core positioned within said coil; said ferrite core and said coil disposed within said annular channel; said housing having an upper casing section and a lower casing section; said upper casing section removable from said lower casing section; said coil permanently fixed in said lower casing section; said ferrite core permanently mounted in said upper casing section; said upper casing section rotatable with respect to said lower casing.

5. An antenna for a miniature radio comprising a ferrite core and coil disposed to receive said ferrite core and a housing; said housing having a peripheral rim; the interior of said peripheral rim having an annular channel secured thereto; each of said ferrite core and said coil arcuately shaped; said ferrite core positioned within said coil; said ferrite core and said coil disposed within said annular channel; said housing having an upper casing section and a lower casing section; said upper casing section removable from said lower casing section; said coil permanently fixed in said lower casing section; and a circuit panel board containing electric radio receiver means secured to said lower casing section.

6. An antenna for a miniature radio comprising a ferrite core and coil disposed to receive said ferrite core and a housing; said housing having a peripheral rim; the interior of said peripheral rim having an annular channel secured thereto; each of said ferrite core and said coil arcuately shaped; said ferrite core positioned within said coil; said ferrite core and said coil disposed within said annular channel; said housing having an upper casing section and a lower casing section; said upper casing section removable from said lower casing section; said coil permanently fixed in said lower casing section; and a circuit panel board containing electric radio receiver means secured to said lower casing section; and an ear-piece having a wire support frame thereon secured to and extending from said lower casing section.

7. An antenna for a miniature radio comprising a ferrite core and coil disposed to receive said ferrite core and a housing; each of said ferrite core and said coil arcuately shaped; said ferrite core positioned within said coil; said ferrite core and said coil disposed within said housing; said housing having an upper casing section and a lower casing section; said upper casing section removable from said lower casing section; said coil permanently fixed in said lower casing section; said upper and lower casings having extending rims; said rim of said lower casing telescopically received by said rim of said upper casing.

8. An antenna for a miniature radio comprising a ferrite core and coil disposed to receive said ferrite core and a housing; each of said ferrite core and said coil arcuately shaped; said ferrite core positioned within said coil; said ferrite core and said coil secured within said housing; said housing having an upper casing section and a lower casing section; said upper casing section removable from said lower casing section; said coil permanently fixed in said lower casing section; said ferrite core permanently mounted in said upper casing section; said upper casing section rotatable with respect to said lower casing; said upper and lower casings having extending rims; said rim of said lower casing telescopically received by said rim of said upper casing; the outer rim of said upper or lower casing having a window therein; the inner rim of said upper or lower casing having an index scale thereon exposed through said window.

References Cited by the Examiner

UNITED STATES PATENTS

| | | | |
|---|---|---|---|
| 977,462 | 12/1910 | Matthews | 343—788 |
| 1,710,085 | 4/1929 | Cooper | 325—365 |
| 2,304,761 | 12/1942 | Harvey | 334—76 |

FOREIGN PATENTS

| | | |
|---|---|---|
| 788,099 | 12/1957 | Great Britain. |

OTHER REFERENCES

Cordless Audio Receiving Device: Electronics, Jan. 1, 1957, pp. 200, 202.

DAVID G. REDINBAUGH, *Primary Examiner.*